US009166659B2

(12) United States Patent
Nammi (10) Patent No.: US 9,166,659 B2
(45) Date of Patent: Oct. 20, 2015

(54) METHOD AND DEVICE FOR SELECTING PRECODING MATRICES BASED ON REPRESENTATIONS OF SPEED OF RELATED DEVICES

(75) Inventor: Sairamesh Nammi, Kista (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 14/372,403

(22) PCT Filed: Jan. 23, 2012

(86) PCT No.: PCT/SE2012/050052
§ 371 (c)(1),
(2), (4) Date: Jul. 15, 2014

(87) PCT Pub. No.: WO2013/112079
PCT Pub. Date: Aug. 1, 2013

(65) Prior Publication Data
US 2015/0003553 A1    Jan. 1, 2015

(51) Int. Cl.
*H04B 7/04* (2006.01)
*H04B 7/06* (2006.01)
*H04W 64/00* (2009.01)

(52) U.S. Cl.
CPC ............ *H04B 7/0417* (2013.01); *H04B 7/0456* (2013.01); *H04B 7/063* (2013.01); *H04W 64/006* (2013.01); *H04B 7/0639* (2013.01)

(58) Field of Classification Search
CPC .... H04B 7/0417; H04B 7/0456; H04B 7/063; H04B 7/0639; H04B 7/0617; H04B 17/0042; H04B 17/005; H04B 17/0057; H04B 17/0067; H04W 64/006; H04L 2025/03414; H04L 2025/0342; H04L 2025/03426
See application file for complete search history.

(56) References Cited

U.S. PATENT DOCUMENTS 8,339,977 B2 * 12/2012 Wild .............................. 370/252
2008/0205333 A1 * 8/2008 Budianu et al. ............... 370/329
(Continued)

FOREIGN PATENT DOCUMENTS

| JP | 2011/029894 A | 2/2011 |
| WO | WO 2009/099151 A1 | 8/2009 |
| WO | WO 2011/123976 A1 | 10/2011 |

OTHER PUBLICATIONS

International Search Report for PCT Application No. PCT/SE2012/050052 mailed Feb. 1, 2013, 4 pages.
(Continued)

*Primary Examiner* — Hirdepal Singh
(74) *Attorney, Agent, or Firm* — Patent Portfolio Builders, PLLC (57) ABSTRACT

Communication may be provided from a first communication device over a multiple-input-multiple-output (MIMO) wireless channel to a second communication device. More particularly, feedback may be received at the first communication device from the second communication device, with the feedback including a precoding matrix selection from the second communication device. A representation of a speed of the second communication device relative to the first communication device may be generated. Responsive to the representation of the speed of the second communication device indicating a speed that is greater than a selection threshold, a generalized precoding matrix may be selected that is different than a precoding matrix indicated by the precoding matrix selection from the second communication device. Related devices are also discussed.

20 Claims, 5 Drawing Sheets

(56) References Cited

U.S. PATENT DOCUMENTS

| | | | |
|---|---|---|---|
| 2009/0034639 A1* | 2/2009 | Hwang et al. | 375/260 |
| 2009/0086648 A1* | 4/2009 | Xu et al. | 370/252 |
| 2010/0284351 A1* | 11/2010 | Liang et al. | 370/329 |
| 2011/0255483 A1* | 10/2011 | Xu et al. | 370/329 |
| 2011/0310831 A1* | 12/2011 | Bhattad et al. | 370/329 |
| 2012/0014425 A1* | 1/2012 | Zhuang et al. | 375/224 |
| 2013/0034040 A1* | 2/2013 | Priotti | 370/312 |
| 2013/0215823 A1* | 8/2013 | Shin et al. | 370/328 |
| 2014/0133317 A1* | 5/2014 | Chen et al. | 370/252 |
| 2014/0133441 A1* | 5/2014 | Zhang et al. | 370/329 |

OTHER PUBLICATIONS

Weis et al.: "Multi-user downlink precoding in FDD systems without channel feedback" Proc. of the 20$^{th}$ Meeting of the Wireless World Research Forum (WWRF), (Ottawa, ON, Canada), Apr. 2008; 4 pages.

Telatar: "Capacity of Multi-antenna Gaussian Channels", European Transaction on Telecommunications, vol. 10, No. 6, Nov.-Dec. 1999; Communication Theory; pp. 585-595.

3GPP "UTRA-UTRAN Long Term Evolution (LTE) and 3GPP System Architecture Evolution (SAE)" ftp://ftp.3gpp.org/Inbox/2008_web_files/LTA_Paper.pdf, last updated Oct. 4, 2006, reprinted Jan. 11, 2012; 8 pages.

Scaglione et al.: "Optimal Designs for Space-Time Linear Precoders and Decoders" (IEEE Transactions on Signal Processing, vol. 50, No, 5, May 2002, pp. 1051 to 1064.

Sampath et al.: "Generalized Linear Precoder and Decoder Design for MIMO Channels Using the Weighted MMSE Criterion" (IEEE Transactions on Communications, vol. 49, No. 12, Dec. 2001, pp. 2198 to 2206.

Mukkavilli et al.: "Design of Multiple Antenna Coding Schemes With Channel Feedback" (Proc. Annual Asilomar Conf. on Signal Systems and Components, 2001, pp. 1009-1013).

Love et al.: "Quantized Antenna Weighting Codebook Design for Multiple-Input Multiple-Output Wireless Systems" (Proc. 40$^{th}$ Allerton Conf. Communications, Control, and Computing, Monticello, IL, 2002). 4 pages.

R1-111763, Ericsson, "4-branch MIMO for HSDPA," 3GPP TSG RAN WG1 Meeting #65, Barcelona Spain, May 9-13, 2011; 17 pages.

R1-113431, Ericsson, ST-Ericsson, "Initial discussion on pilot design for 4-branch MIMO", 3GPP TSG RAN WG1 Meeting #66b, Zhuhai, China, Oct. 10-14, 2011; 4 pages.

Hugl et al.: "Transformation based downlink beamforming techniques for frequency division duplex systems," 2000 Int. Symposium on Antennas and Propagation (ISAP 2000), Fukuoka, Japan, Aug. 2000, pp. 1529-1532.

International Preliminary Report on Patentability Corresponding to International Application No. PCT/SE2012/050052; Date of Mailing: Aug. 7, 2014; 10 Pages.

* cited by examiner

METHOD AND DEVICE FOR SELECTING PRECODING MATRICES BASED ON REPRESENTATIONS OF SPEED OF RELATED DEVICES

CROSS REFERENCE TO RELATED APPLICATION

This application is a 35U.S.C. § 371 national stage application of PCT International Application No. PCT/SE2012/050052, filed on 23Jan. 2012, the disclosure of which is incorporated by reference herein in its entirety. The above-referenced PCT International Application was published in the English language as International Publication No. WO 2013/112079 A1on 1 Aug. 2013.

TECHNICAL FIELD

The present disclosure is directed to wireless communications and, more particularly, to wireless communications using multiple transmit and receive antennas.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver are equipped with multiple antennas to provide a multiple-input multiple-output (MIMO) communication channel. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from an antenna array over a MIMO channel to a wireless terminal, for example, spatial multiplexing (or SM) may allow the simultaneous transmission of multiple symbol streams over the same frequency from different antennas of the base station antenna array. Stated in other words, multiple symbol streams may be transmitted from different antennas of the base station antenna array to the wireless terminal over the same downlink time/frequency resource element (TFRE) to provide an increased data rate. In a downlink from the same base station transmitting from the same antenna array to the same wireless terminal, transmit diversity (e.g., using space-time codes) may allow the simultaneous transmission of the same symbol stream over the same frequency from different antennas of the base station antenna array. Stated in other words, the same symbol stream may be transmitted from different antennas of the base station antenna array to the wireless terminal over the same time/frequency resource element (TFRE) to provide increased reliability of reception at the wireless terminal due to transmit diversity gain.

The performance of a wireless communication system can thus be improved using multiple antennas at the base station and/or wireless terminal to provide spatial multiplexing SM in more favorable channel conditions and to provide transmit diversity gain in less favorable channel conditions. Transmit diversity and/or spatial multiplexing may be implemented without knowledge of the wireless channel at the transmitter. In many wireless communication standards such as the $3^{rd}$ Generation Partnership Project (3GPP), Long Term Evolution (LTE), High-Speed Downlink Packet Access (HSDPA), and/or Worldwide Interoperability for Microwave Access (WiMAX), however, knowledge of the wireless channel (referred to as channel state information or CSI) may be provided at the MIMO transmitter via feedback from the receiver as discussed, for example, in the $3^{rd}$ Generation Partnership Project document entitled "UTRA-UTRAN Long Term Evolution (LTE) And 3GPP System Architecture Evolution (SAE)" (http.//www.3gpp.org/Highlights/LTE/LTE.htm). Accordingly, the MIMO transmitter can use the channel state information (or CSI) to provide precoding to further improve system performance as discussed, for example, by Scaglione et al. in "Optimal Designs For Space-Time Linear Precoders And Decoders" (IEEE Transactions On Signal Processing, Vol. 50, No. 5, May 2002, pages 1051 to 1064) and by Sampath et al. in "Generalized Linear Precoder And Decoder Design For MIMO Channels Using The Weighted MMSE Criterion" (IEEE Transactions On Communications, Vol. 49, No. 12, December 2001, pages 2198 to 2206). CSI precoding can thus be used by a MIMO transmitter to provide beam forming gain and/or to condition transmissions to existing characteristics of the wireless channel.

Communications standards such as 3GPP, LTE, HSDPA, and/or WiMAX may use frequency division duplex (FDD) such that uplink and downlink communications between two communications devices (e.g., between a wireless terminal and a base station) are provided over different carrier frequencies. In such FDD MIMO systems (referred to as limited feedback systems), channel state information may be provided at a MIMO transmitter as feedback information from the receiving device with which it is communicating. For example, a MIMO transmitter at a base station may transmit over a downlink (using a first carrier frequency) to a wireless terminal, and the wireless terminal may provide channel state information for the downlink as feedback that is transmitted over the uplink (using a second carrier frequency different than the first carrier frequency) to the base station. In such limited feedback systems, CSI feedback may be provided, for example, using codebook based feedback and/or quantized channel feedback as discussed, for example, by Mukkavilli et al. in "Design Of Multiple Antenna Coding Schemes With Channel Feedback" (Proc. Annual Asilomar Conf. On Signal Systems And Components, 2001, pages 1009-1013) and by Love et al. in "Quantized Antenna Weighting Codebook Design For Multiple-Input Multiple-Output Wireless Systems" (Proc. $40^{th}$ Allerton Conf. Communications, Control, And Computing, Moticello, Ill., 2002). Communications standards such as 3GPP, LTE, HSDPA, and WiMAX may use codebook based CSI feedback for precoding.

With codebook based precoding, a same codebook of precoding matrices is defined at both the transmitting and receiving devices (e.g., at both the base station and wireless terminal). The precoding matrices (also referred to as precoding codewords, precoding codebook entries, precoding vectors, etc.) may be constructed using methods such as Grasmanian, Lyod algorithm, Discrete Fourier transform DFT matrix, etc. At the receiving device (e.g., at the wireless terminal), Signal-to-Interference-and-Noise-Ratios (SINRs) may be calculated for received downlink signals for each of the precoding matrices of the codebook, and a rank and a precoding matrix providing the best performance (e.g., highest spectral efficiency and/or capacity) may be selected for CSI feedback. Because the matrices of the codebook are known at both the transmitting and receiving devices, the receiving device may include a precoding matrix index (PMI, also referred to as a precoding matrix indicator) in the channel state information that is provided to the transmitting device wherein the precoding matrix index uniquely identifies the selected precoding matrix and rank. By providing an index as opposed to the precoding matrix, communication resources may be used more efficiently.

In general, the wireless terminal may decide whether to receive over a downlink in a MIMO diversity mode or in a MIMO multiplexed mode, and the wireless terminal reports this decision using a Rank Indicator (RI). For example, a Rank Indicator of 1 may specify a MIMO diversity mode providing only one symbol stream (also referred to as a transmission layer), a Rank Indicator of 2 may specify a MIMO multiplexed mode simultaneously providing two symbol streams (or transmission layers), a Rank Indicator of 3 may specify a MIMO diversity mode simultaneously providing three symbol streams (or transmission layers), a Rank Indicator of 4 may specify a MIMO multiplexed mode simultaneously providing four symbol streams (or transmission layers), etc. For example, with a four antenna base station transmitter, Rank Indicators from 1 to 4 may be available, and with an eight antenna base station transmitter, Rank Indicators from 1 to 8 may be available. Moreover, the codebook may include multiple precoding matrices for each of the ranks. With a four antenna base station transmitter, up to four different transmission layers defined by four respective Rank Indicators (e.g., Rank Indicators 1 to 4) may be available, and 16 precoding matrices may be provided for each transmission layer or rank for a codebook of 64 precoding matrices. With an eight antenna base station transmitter, up to eight different transmission layers defined by eight respective Rank Indicators (e.g., Rank Indicators 1 to 8) may be available, and 16 precoding matrices may be provided for each transmission layer or rank for a codebook of 128 precoding matrices.

Cellular operators have begun offering mobile broadband based on WCDMA/HSPA, and fuelled by new devices designed for data applications, end user performance requirements are steadily increasing. The increased use of mobile broadband has resulted in increased traffic volumes being handled by the HSPA networks. Techniques that allow cellular operators to more efficiently manage their spectrum resources may have increasing importance.

One technique to improve downlink performance may be to introduce support for 4-branch MIMO using four transmitter and four receiver antennas. Given a fixed level of transmission power, the supported peak data rate may be doubled so that 84 Mbps can be supported on a single downlink 5 MHz carrier, and/or coverage for rank-1 and rank-2 transmissions may be improved due to the higher order of beamforming gain.

Introduction of 4-branch MIMO may require new pilot symbols to be transmitted. One approach may be to extend the pilots of 2-branch MIMO (e.g., Primary Common Pilot Channel or P-CPICH, and Secondary Common Pilot Channel or S-CPICH) to $3^{rd}$ and $4^{th}$ antennas (e.g., providing tertiary and quaternary pilots). Unfortunately, these additional pilot symbols may act as interference for legacy UEs and other sector UEs, reducing their throughputs. Another option is to use common pilots for channel sounding and dedicated (precoded) pilots for data demodulation. Dedicated pilots may not cause any interference to legacy UEs and the other sector users. These technologies are discussed in 3GPP standards documents such as: R1-111763, Ericsson, "4-branch MIMO for HSDPA," 3GPP TSG RAN WG1 Meeting #65, Barcelona Spain, $9^{th}$-$13^{th}$ May 2011; and R1-113431, Ericsson, ST-Ericsson, "Initial discussion on pilot design for 4-branch MIMO", 3GPP TSG RAN WG1 Meeting #66b, Zhuhai, China, $10^{th}$-$14^{th}$ Oct. 2011.

Figure 6:
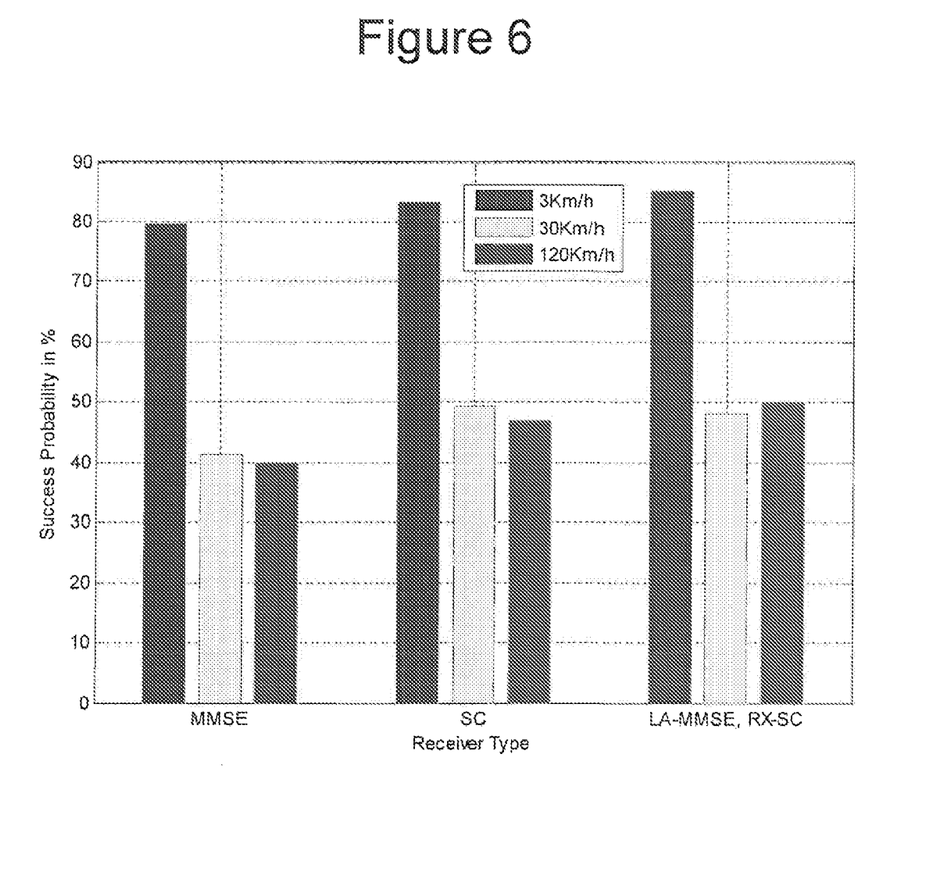
FIG. 6 is a graph illustrating packet success probabilities for different receiver types at different wireless terminal speeds.

When dedicated (precoded) pilots are used for data demodulation, the NodeB may choose the precoding matrix. One option is to use the precoding matrix chosen by UE (and communicated through the feedback channel). For UEs with slowly changing channels, this precoding matrix may provide suitable performance, but for UEs with more rapidly changing channels, the precoding matrix chosen by the UE may be outdated before a next data block transmission over the downlink. FIG. 6 shows packet success probabilities with 3 different Link adaptation schemes. The first scheme uses an Minimum Mean Square Error (MMSE) receiver, the second scheme uses a Serial Cancellation (SC) receiver, and the third scheme uses link adaptation with MMSE and detection with serial cancellation. For slow speed UEs (at 3 km/hour), the packet success probability is more than 80% for all the cases. For medium to high speed UEs (at 30 km/hour and 120 km/hour), however, the packet success probability is less than 50%. If common pilots are used for channel sounding and data demodulation, the performance may thus be reduced compared to open loop MIMO.

SUMMARY

It may therefore be an object to address at least some of the above mentioned disadvantages and/or to improve performance in a wireless communication system.

According to some embodiments, communication may be provided from a first communication device over a multiple-input-multiple-output (MIMO) wireless channel to a second communication device. More particularly, feedback may be received at the first communication device from the second communication device, with the feedback including a precoding matrix selection from the second communication device. A representation of a speed of the second communication device relative to the first communication device may be generated. Responsive to the representation of the speed of the second communication device indicating a speed that is greater than a selection threshold, a generalized precoding matrix may be selected that is different than a precoding matrix indicated by the precoding matrix selection from the second communication device. Further responsive to selecting the generalized precoding matrix, a data block may be transmitted from the first communication device over the MIMO wireless channel to the second communication device using the generalized precoding matrix.

Responsive to the representation of the speed of the second communication device indicating a speed that is less than the selection threshold, the precoding matrix indicated by the precoding matrix selection from the second communication device may be selected. Further responsive to selecting the precoding matrix indicated by the precoding matrix selection from the second communication device, a data block may be transmitted from the first communication device over the MIMO wireless channel to the second communication device using the precoding matrix indicated by the precoding matrix selection from the second communication device.

Generating the representation may include generating the representation of the speed of the second communications device based on a Doppler shift of a transmission from the second communication device received at the first communication device. According to other embodiments, generating the representation may include generating the representation of the speed of the second communications device based on changes in channel quality information received from the second communication device. According to still other embodiments, generating the representation may include generating the representation of the speed of the second communications device based on changes in precoding matrix indices received from the second communication device. According to yet other embodiments, generating the representation may include generating the representation of the speed of the second communications device based on information in pilot and/or reference signals received from the second communications device.

The precoding matrix selection may include a precoding matrix index (PMI), the first communication device may be a radio base station, and/or the second communications device may be a wireless terminal (also referred to as a UE).

According to some other embodiments, a first communication device may include a transceiver and a processor coupled to the transceiver. The transceiver may be configured to provide transmissions over a multiple-input-multiple-output (MIMO) wireless channel to a second communication device, and to receive transmissions from the second communications device. The processor may be configured to receive feedback through the transceiver from the second communication device with the feedback including a precoding matrix selection from the second communication device, to generate a representation of a speed of the second communication device relative to the first communication device, and to select a generalized precoding matrix that is different than a precoding matrix indicated by the precoding matrix selection from the second communication device responsive to the representation of the speed of the second communication device indicating a speed that is greater than a selection threshold. Further responsive to selecting the generalized precoding matrix, the processor may be configured to transmit a data block through the transceiver over the MIMO wireless channel to the second communication device using the generalized precoding matrix.

Responsive to the representation of the speed of the second communication device indicating a speed that is less than the selection threshold, the processor may be configured to select the precoding matrix indicated by the precoding matrix selection from the second communication device. Further responsive to selecting the precoding matrix indicated by the precoding matrix selection from the second communication device, the processor may be configured to transmit a data block through the transceiver over the MIMO wireless channel to the second communication device using the precoding matrix indicated by the precoding matrix selection from the second communication device.

The processor may be configured to generate the representation of the speed of the second communications device based on a Doppler shift of a transmission from the second communication device received through the transceiver. According to other embodiments, the processor may be configured to generate the representation of the speed of the second communications device based on changes in channel quality information received through the transceiver from the second communication device. According to still other embodiments, the processor may be configured to generate the representation of the speed of the second communications device based on changes in precoding matrix indices received through the transceiver from the second communication device. According to yet other embodiments, the processor may be configured to generate the representation of the speed of the second communications device based on information in pilot and/or reference signals received through the transceiver from the second communications device.

The precoding matrix selection may include a precoding matrix index (PMI), the first communication device may be a radio base station, and/or the second communications device may be a wireless terminal.

By considering a speed of a wireless terminal when selecting a precoding matrix for downlink transmissions to a wireless terminal, precoding matrices may be more efficiently selected at a radio base station. More particularly, a radio base station may automatically block selection of a precoding matrix recommended by a wireless terminal when a speed of the wireless terminal is relatively high because a precoding matrix recommended by such a fast moving wireless terminal is likely to be quickly outdated. For relatively high speed wireless terminals, the base station may instead automatically select a generalized precoding vector that is configured to provide reasonable performance for high speed wireless terminals where the downlink channel is likely to change quickly.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

Figure 1:
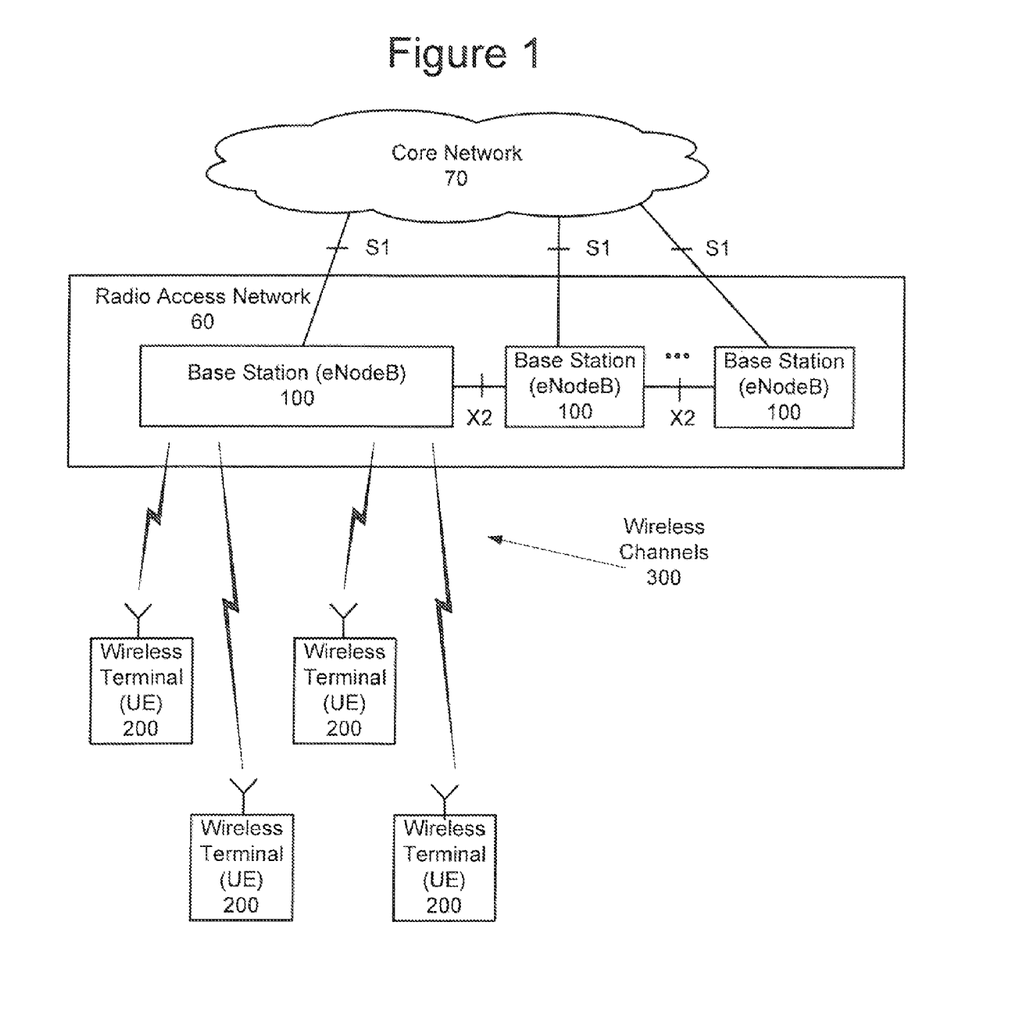
FIG. 1 is a block diagram of a communication system that is configured according to some embodiments.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
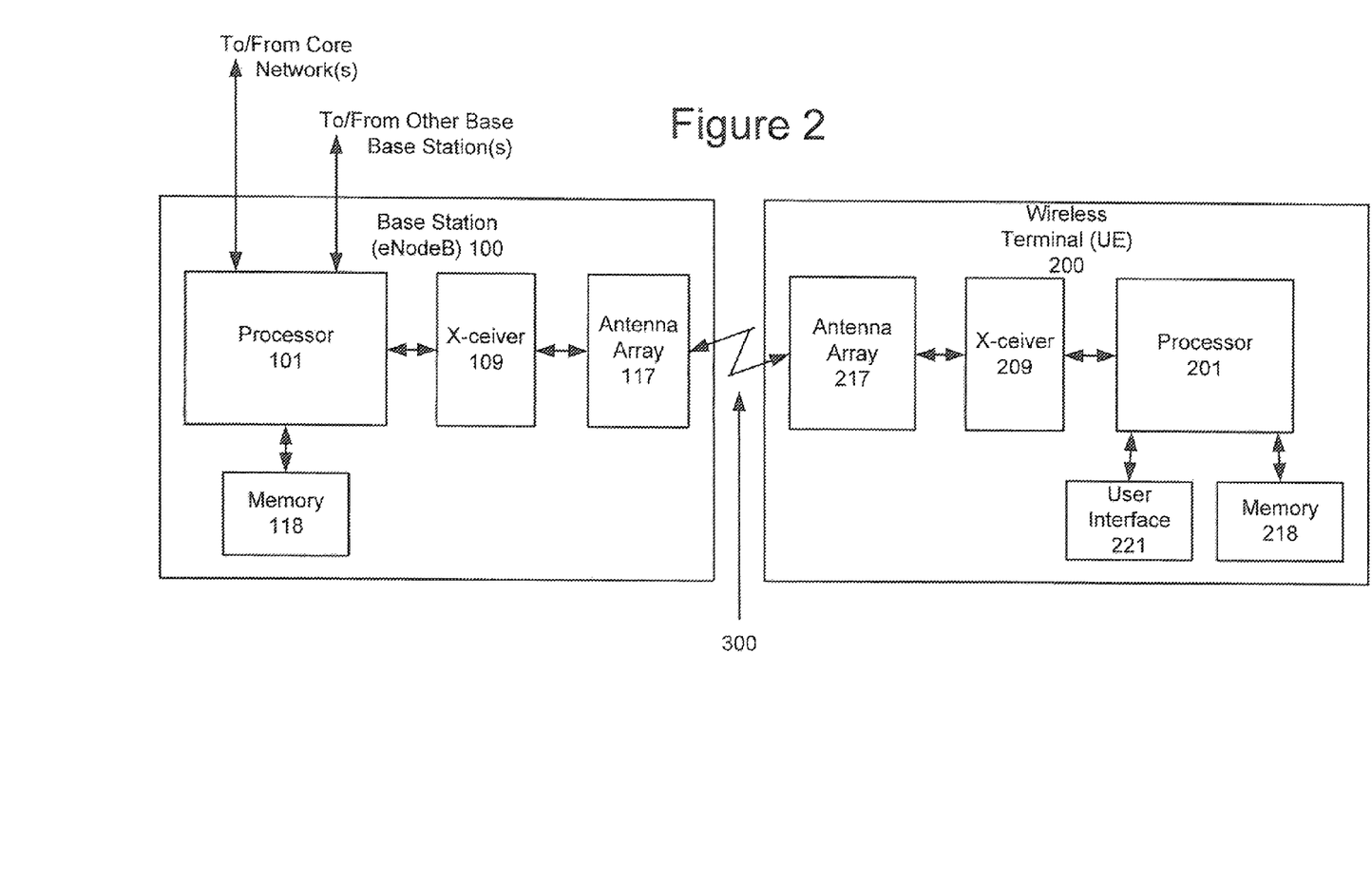
FIG. 2 is a block diagram of a base station and a wireless terminal (UE) in communication over a wireless channel according to some embodiments of FIG. 1.

FIG. 2 is a block diagram of a base station 100 and a wireless terminal 200 of FIG. 1 in communication over a wireless channel 300 according to some embodiments of the present invention. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209, and wireless terminal processor 201 may transmit communications though transceiver 209 and antenna array 217 for reception at base station 100 through antenna array 117 and transceiver 109.

In downlink communications from base station 100 to wireless terminal 200, base station processor 101 may generate transport data blocks from an input data stream, and the transport data blocks may be transmitted though MIMO transceiver 109 and MIMO antenna array 117 over wireless channel 300 to wireless terminal 200. Wireless terminal 200 then receives the transport data blocks through antenna array 217 and transceiver 209 to regenerate the transport data blocks for processor 201, and processor 201 may then regenerate the input data stream based on the transport data blocks from transceiver 209. When transmitting the transport data blocks, base station transceiver 109 may select one of a plurality of precoding matrices from a precoding codebook to precode symbols for transmission from the plurality of antenna elements of the antenna array, and precoding matrices may be selected based on knowledge of the downlink wireless channel 300 from base station 100 to wireless terminal 200.

Knowledge of the wireless downlink channel (referred to as channel state information or CSI) may be provided at base station 100 (the MIMO transmitter) via feedback from wireless terminal 200 (the MIMO receiver). Accordingly, the base station processor 101 and/or transceiver 109 can use the channel state information (or CSI) to select a precoding matrix from the precoding codebook to further improve system performance. Base station 100 can thus use the channel state information (C SI) to select a precoding matrix to provide beam forming gain and/or to condition transmissions to existing characteristics of the wireless channel.

According to some embodiments of the present invention, base station transceiver 109 may transmit transport data blocks to wireless terminal 200 over a downlink (using a first carrier frequency), and the wireless terminal 200 may provide channel state information for the downlink as feedback that is transmitted over an uplink (using a second carrier frequency different than the first carrier frequency) to the base station 100. In such a limited feedback system, CSI feedback may be provided, for example, using codebook based CSI feedback for precoding according to a communication standard such as 3GPP, LTE, HSDPA, and WiMAX.

With codebook based precoding, a same codebook of precoding matrices is defined at both at both base station 100 and wireless terminal 200 (e.g., the codebook of precoding matrices may be stored at base station memory 118 and at wireless terminal memory 218). The precoding matrices (also referred to as precoding codewords, precoding codebook entries, precoding vectors, etc.) may be constructed using methods such as Grasmanian, Lyod algorithm, Discrete Fourier transform DFT matrix, etc. At wireless terminal 200, Signal-to-Interference-and-Noise-Ratios (SINRs) may be calculated for downlink signals received from base station 100 for each of the precoding matrices of the codebook, and a rank and a precoding matrix providing the best performance (e.g., highest spectral efficiency and/or capacity) may be selected for CSI feedback. Because the precoding matrices of the codebook are known at both base station 100 and wireless terminal 200, wireless terminal 200 may include a precoding matrix index (PMI) in the channel state information that is provided to base station 100, with the precoding matrix index uniquely identifying the selected precoding matrix and rank.

According to some embodiments of the present invention, base station processor 101 may select a precoding matrix responsive to a representation of speed of wireless terminal 200. Wireless terminal 200, for example, may transmit channel state information to base station 100, with the channel state information including a precoding matrix selection/recommendation (e.g., a precoding matrix index identifying a precoding matrix selected/recommended by wireless terminal 200). Responsive to the representation of the speed of wireless terminal 200 exceeding a selection threshold, base station processor 101 may select a generalized precoding matrix that is different than a precoding matrix indicated by the precoding matrix selection/recommendation from wireless terminal 200. Responsive to the representation of the speed of the wireless terminal 200 being less than the selection threshold, base station processor 101 may select the precoding matrix indicated by the precoding matrix selection/recommendation from wireless terminal 200. Base station processor 101, for example, may generate the representation of speed of wireless terminal 200 based on a Doppler shift of a transmission from wireless terminal 200 received at base station 100 (through antenna array 117 and transceiver 109).

Base station 101 may transmit pilot symbols (also referred to as pilot signals), and pilot symbols may be used by wireless terminal 200 for channel sounding and/or data demodulation. More particularly, common pilot symbols (transmitted without precoding) may be used by wireless terminal 200 for channel sounding, and dedicated pilot symbols (transmitted in precoded data blocks to a particular wireless terminal 200) may be used by wireless terminal 200 for data demodulation.

According to some embodiments, base station 100 may transmit common pilot symbols without using dedicated pilot symbols. In such a common pilot system, base station processor 101 may periodically transmit known common pilot symbols (without precoding) through transceiver 109 and antenna array 117 to be used by wireless terminal 200 for downlink channel sounding. Wireless terminal processor 201 may use the common pilot symbols to estimate downlink channel quality/characteristics (e.g., using SINR or Signal to Interference and Noise Ratio) based on the common pilot symbols received through antenna array 217 and transceiver 209. Wireless terminal processor 201 may then select/recommend a precoding matrix for its downlink from base station 100 for a next/subsequent downlink transmission(s) to be received from base station 100. A precoding matrix may thus be selected/recommended by wireless terminal processor 201 and transmitted through transceiver 209 and antenna array 217 to base station 100 over a feedback channel. Base station processor 101 may process feedback information (including the precoding matrix selected/recommended by wireless terminal 200) from wireless terminal 200 to select/determine a precoding matrix, channel quality indication (CQI), and/or other parameters (e.g., transport block size, etc.), and this information may transmitted through transceiver 109 and antenna array 117 to wireless terminal 200 over a downlink control channel.

In embodiments using common pilot symbols (without dedicated pilot symbols), processor 101 may break a data stream into transport data blocks, and each transport data block may be precoded by base station transceiver 109 using the precoding matrix selected by base station processor 101. In addition, known common pilot symbols may be transmitted by processor 101 through transceiver 109 and antenna array 117 without precoding. Wireless terminal processor 201 may estimate the channel for data demodulation using the common pilot symbols received through antenna array 217 and transceiver 209. If base station processor 101 selects a precoding matrix other than the precoding matrix selected by wireless terminal 200, the precoding matrix selected by base station processor 101 may need to be transmitted to wireless terminal 200 over a downlink control channel before transmitting data to wireless terminal 200 over the downlink channel.

Figure 3:
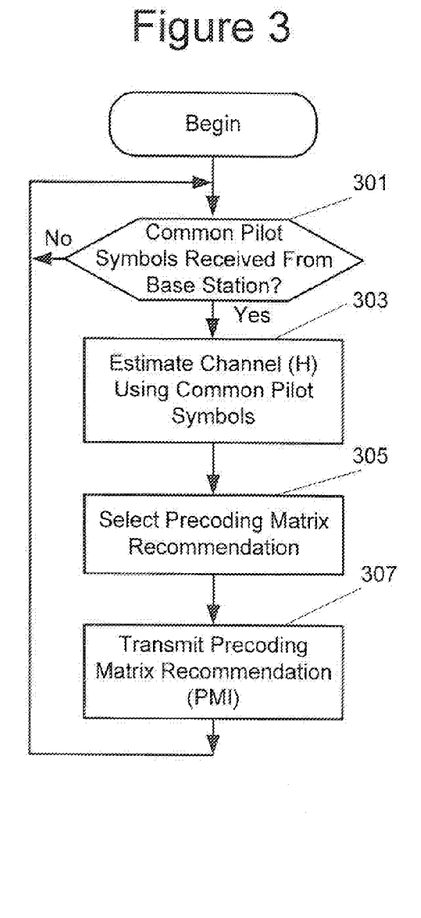
FIGS. 3, 4A, and 4B are flow charts illustrating wireless terminal operations according to some embodiments.
Figure 4A:
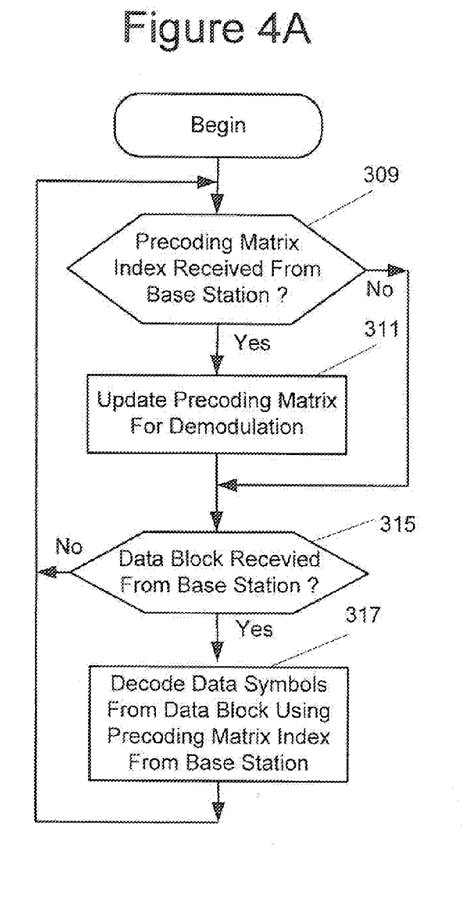

Wireless terminal 200 operations in embodiments using common pilot symbols (without dedicated pilot symbols) are now discussed with respect to the flow charts of FIGS. 3 and 4A. In particular, FIG. 3 illustrates operations of wireless terminal 200 providing feedback including a precoding matrix recommendation. As discussed above, common pilot symbols may be transmitted by base station 100 without precoding, and when such common pilot symbols are received at wireless terminal processor 201 (through antenna array 217 and transceiver 209) at block 301, processor 201 may estimate the downlink channel (H) using the common pilot symbols at block 303. Processor 201 may then select a precoding matrix recommendation at block 305 based on the channel estimate from block 303. At block 307, processor 201 may then transmit the precoding matrix recommendation (e.g., as feedback including a PMI identifying the precoding matrix recommendation) to base station 100. As discussed in greater detail below, base station processor 101 may use this precoding matrix recommendation from wireless terminal 200 to select the precoding matrix to be used for subsequent transmissions. Base station processor 101, however, may select a precoding matrix different than that selected/recommended by wireless terminal 200, for example, depending on a speed of wireless terminal 200.

FIG. 4A illustrates operations of wireless terminal 200 receiving downlink communications from base station 100 in embodiments without dedicated pilot symbols. Without dedicated pilot symbols, base station 100 may need to provide an identification (e.g., PMI) of the actual precoding matrix that it has selected for downlink transmissions over a downlink control channel. If such feedback is received at wireless terminal processor 201 (through antenna array 217 and transceiver 209) at block 309, processor 201 may update its precoding matrix to be used for subsequent data demodulation at block 311. If a transport data block is received through antenna array 217 from base station 100 at block 315, transceiver 209 and/or processor 201 may demodulate and/or decode the transport data block using the precoding matrix most recently identified by base station 100.

According to some communication systems, base station 100 may transmit common pilot symbols without precoding, and base station 100 may also transmit dedicated pilot symbols with transport data blocks where the dedicated pilot symbols and the transport data blocks are precoded using a precoding matrix selected by base station processor 101. As before, known common pilot symbols may be used for channel sounding. Wireless terminal processor 201 may receive the known common pilot symbols from base station 100 through antenna array 217 and transceiver 209, and wireless terminal processor 201 may estimate the downlink channel based on the received common pilot symbols. Wireless terminal processor 201 may then select/recommend precoding matrix for its downlink from base station 100 for a next/subsequent downlink transmission, and wireless terminal processor 201 may then transmit the precoding matrix recommendation through transceiver 209 and antenna array 217 to base station 100 over a feedback channel. Base station processor 101 may then process feedback information (including the precoding matrix selected/recommended by wireless terminal 200) from wireless terminal 200 to select/determine a precoding matrix, channel quality indication (CQI), and/or other parameters (e.g., transport block size, etc.). Base station 100, however, may not need to transmit the selected precoding matrix over a downlink control channel before transmitting data when using dedicated pilot symbols.

When transmitting data with dedicated pilot symbols, processor 101 may break a data stream into transport data blocks, and each transport data block together with dedicated pilot symbols may be multiplied by the precoding matrix selected by base station 101 and transmitted through transceiver 109 and antenna array 117 over the downlink to wireless terminal 200. Using the dedicated pilot symbols that are precoded and transmitted with the data, wireless terminal processor 201 can estimate the effective downlink channel (i.e., the channel multiplied by the precoding matrix) to determine the precoding matrix and demodulate the data. With dedicated pilot symbols, there is no need for base station 100 to inform wireless terminal 200 of its precoding matrix selection (even if the base station selects a precoding matrix different than that selected by the wireless terminal). Accordingly, traffic transmitted over a downlink control channel from base station 100 to wireless terminal 200 may be reduced.

Figure 4B:
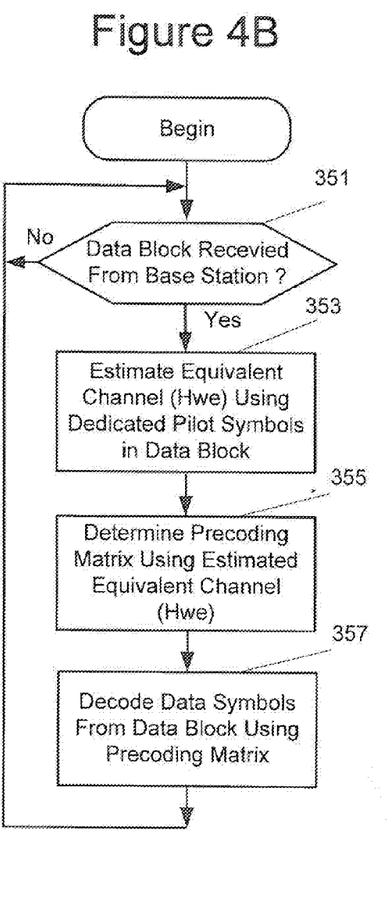

Wireless terminal 200 operations in embodiments using common pilot symbols and dedicated pilot symbols are now discussed with respect to the flow charts of FIGS. 3 and 4B. Wireless terminal 200 operations of providing feedback are substantially the same as those discussed above with respect to FIG. 3 and further discussion thereof will be omitted for the sake of conciseness.

FIG. 4B illustrates operations of wireless terminal 200 receiving downlink communications from base station 100 in embodiments using common pilot symbols and using dedicated pilot symbols. With dedicated pilot symbols, base station 100 may not need to provide an identification (e.g., PMI) of the actual precoding matrix that it has selected for downlink transmissions over a downlink control channel. When a transport data block (including data and dedicated pilot symbols) is received through antenna array 217 from base station 100 at block 351, transceiver 209 and/or processor 201 may estimate the equivalent channel (Hwe) using the dedicated pilot symbols received with the data block at block 353. Processor 201 may use the equivalent channel to determine the precoding matrix used by the base station at block 355, and processor 201 and/or transceiver 209 may then use the precoding matrix demodulate and/or decode the transport data block received from base station 100 at block 357.

Figure 5:
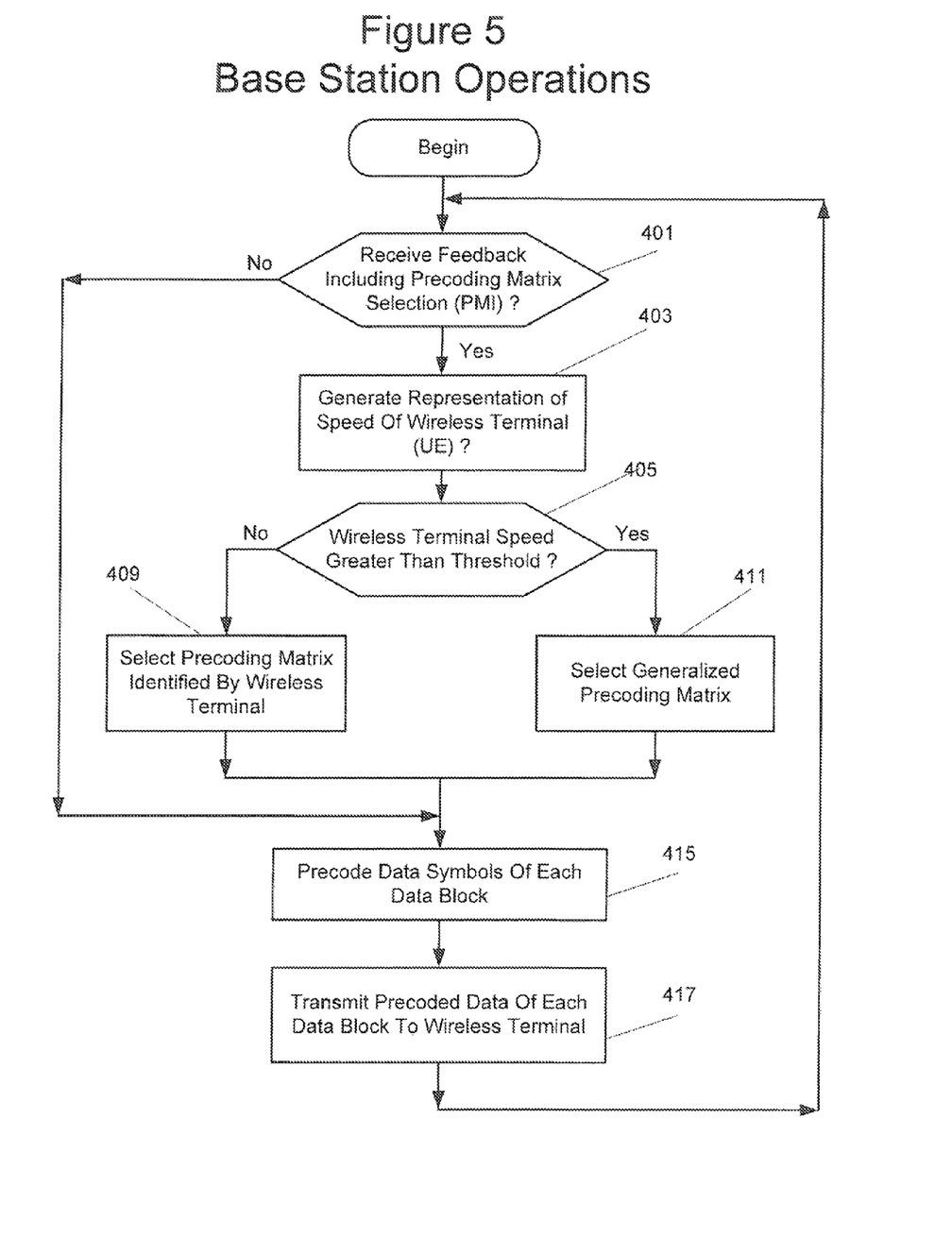
FIG. 5 is a flow chart illustrating base station operations according to some embodiments.

FIG. 5 is a flow chart illustrating operations of base station 100 according to some embodiments of the present invention. As noted above, base station processor 101 and/or transceiver 109 may select a precoding matrix for a downlink to wireless terminal 100 that is the same as or that is different than a precoding matrix that has been recommended by wireless terminal 100 in feedback from wireless terminal 100. More particularly, base station processor 101 may select a precoding matrix based on a recommendation from wireless terminal 100 and/or based on a representation of a speed of wireless terminal 100.

At block 401, processor 101 may receive feedback from wireless terminal 200, with the feedback including a precoding matrix selection (e.g., PMI) as a recommendation from wireless terminal 200. At block 403, processor 101 may generate a representation of a speed of wireless terminal 200 relative to base station 100. Responsive to the representation of the speed of wireless terminal 200 indicating a speed that is greater than a selection threshold at block 405, processor 101 may selecting a generalized precoding matrix that is different than a precoding matrix indicated by the precoding matrix selection/recommendation from wireless terminal 200 at block 411. Responsive to the representation of the speed of wireless terminal 200 indicating a speed that is less than the selection threshold, processor 101 may select the precoding matrix indicated by the precoding matrix selection from wireless terminal 200 at block 409.

Stated in other words, processor 101 may select the precoding matrix recommended by wireless terminal 200 when the representation of speed of wireless terminal 200 is less than the selection threshold, and processor 101 may block selection of the precoding matrix recommended by wireless terminal 200 when the representation of speed of wireless terminal 200 is greater than the selection threshold. When the representation of speed of wireless terminal 200 is greater than the selection threshold, processor 101 may instead select the generalized precoding matrix.

At block 415, processor 101 may provide a transport data block including data from an input data stream and precode the transport data block using a most recently selected precoding matrix selected at either block 409 or 411. In embodiments using common pilot symbols without dedicated pilot symbols as discussed above with respect to FIGS. 3 and 4A, processor 101 and/or transceiver 109 may precode the transport data block without dedicated pilot symbols. In embodiments using common pilot symbols and dedicated pilot symbols as discussed above with respect to FIGS. 3 and 4B, processor 101 and/or transceiver 109 may precode the transport data block with dedicated pilot symbols. More particularly, processor 101 and/or transceiver 109 may precode the transport data block (with or without dedicated pilot symbols) using the generalized precoding matrix at block 415 responsive to selecting the generalized precoding matrix at block 411 when the representation of wireless terminal speed is greater than the selection threshold, or processor 101 and/or transceiver 109 may precode the transport data block (with or without dedicated pilot symbols) using the precoding matrix indicated by the precoding matrix selection/recommendation from wireless terminal 200 at block 415 responsive to selecting the precoding matrix indicated by the precoding matrix selection/recommendation from wireless terminal 200 when the representation of wireless terminal speed is less than the selection threshold. After precoding the transport data block, processor 101 and/or transceiver 109 may transmit the precoded transport data block to wireless terminal 200 at block 417.

Processor 101 may continue precoding and transmitting transport data blocks using a same precoding matrix at blocks 415 and 417 (as indicated by the "No" output from decision block 401) until a next PMI feedback is received from wireless terminal 200 at block 401. Once a next PMI feedback is received from wireless terminal 200 at block 401, operations of blocks 403, 405, 409, and 411 may be repeated to select either the precoding matrix identified (recommended) by wireless terminal 200 or the generalized precoding matrix responsive to the representation of the speed of the wireless terminal.

Processor 101 may use any of a number of techniques to generate a representation of the speed of wireless terminal 200 at block 403. Processor 101, for example, may generate the representation of the speed of wireless terminal 200 based on a Doppler shift of a transmission from wireless terminal 200 (e.g., a Doppler shift of the feedback transmission including the PMI received at block 401) received at base station 100 through antenna array 117 and transceiver 109. A Doppler shift below a Doppler selection threshold may be used to indicate that the speed of wireless terminal 200 is below the threshold of block 405, and a Doppler shift above the Doppler selection threshold may be used to indicate that the speed of wireless terminal 200 is above the threshold of block 405.

According to some other embodiments, processor 101 may generate the representation of the speed of wireless terminal 200 at block 403 based on changes in channel quality information (CQI) and/or precoding matrix index (PMI) received from wireless terminal 200. Wireless terminal 200, for example, may periodically report channel quality information (CQI) and/or precoding matrix index (PMI) to base station 100, for example, at periodic transmission timing intervals (TTIs), and processor 101 may count a number of changes in the channel quality information over a defined number of TTIs to generate a representation of the speed of wireless terminal 200.

For example, CQIs and/or PMIs reported by a relatively slow moving wireless terminal may change relatively infrequently relative to CQIs and/or PMIs reported by a relatively fast moving wireless terminal. If a period of time including ten TTIs is selected over which wireless terminal 200 will generate ten CQI and/or PMI reports, for example, five or fewer changes from one CQI and/or PMI report to the next over the period may indicate that the speed of wireless terminal 200 is below the threshold of block 405, and 6 or more changes from one CQI and/or PMI report to the next over the period may indicate that the speed of wireless terminal 200 is above the threshold of block 405. Stated mathematically, a time period may be defined as $\Delta t = k \cdot TTI$, where k is a constant number and TTI is a time between transmission time intervals.

Regarding CQI, a number of changes of CQI from one TTI to the next over the time period $\Delta t = k \cdot TTI$ may be defined as $\Delta CQI/\Delta t$, and a threshold value of T_CQI may be defined such that wireless terminal 200 speed is deemed to be less than the selection threshold if $\Delta CQI/\Delta t \leq T\_CQI$, and wireless terminal 200 speed is deemed to be greater than the selection threshold if $\Delta CQI/\Delta t \geq T\_CQI$. Regarding PMI, a number of changes of PMI from one TTI to the next over the time period $\Delta t = k \cdot TTI$ may be defined as $\Delta PMI/\Delta t$, and a threshold value of T_PMI may be defined such that wireless terminal 200 speed is deemed to be less than the selection threshold if $\Delta PMI/\Delta t \leq T\_PMI$, and wireless terminal 200 speed is deemed to be greater than the selection threshold if $\Delta PMI/\Delta t \geq T\_PMI$.

According to still other embodiments, processor 101 may generate the representation of the speed of wireless terminal 200 at block 403 based on information in pilot and/or reference signals received from wireless terminal 200.

According to yet other embodiments, processor 101 may generate the representation of the speed of wireless terminal 200 at block 403 based on speed information provided by wireless terminal 200. Wireless terminal 200, for example, may provide/generate positioning information (e.g., global positioning system or GPS information) that may be used to calculate a speed thereof, and wireless terminal 200 may transmit this speed and/or position information to base station 100, thereby allowing base station processor 101 to generate the representation of speed at block 403 using the speed information received from wireless terminal 200. In addition, processor 101 may use speed/position information from wireless terminal 200 to calculate an average speed Savg over a defined period of time (e.g., $\Delta t = k \cdot TTI$), and a speed threshold Tspeed may be defined, for example, between 3 km/hr and 30 km/hr based on the data set forth in FIG. 5. The speed threshold, for example may be between 5 km/hour and 20 km/hour, or between 5 km/hour and 10 km/hour.

At block 411, a generalized precoding matrix may be defined as discussed, for example, by Hugl et al., "Transformation based downlink beamforming techniques for frequency division duplex systems," in 2000 Int. Symposium on Antennas and Propagation (ISAP 2000), Fukuoka, Japan, August 2000, pp. 1529-1532; and/or by Weis et al., "Multi-user downlink precoding in FDD systems without channel feedback," in Proc. of the 20-th Meeting of the Wireless World Research Forum (WWRF), (Ottawa, ON, Canada), April 2008. In other embodiments, a common precoding matrix may be used as the generalized precoding matrix.

Methods and base stations discussed herein, for example, may be used in any closed loop MIMO communications system (e.g., LTE, LTE-Advanced, HSPA+, etc.), and such use may provide improved closed loop MIMO performance.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method providing communication from a first communication device over a muitiple-input- muitiple-output, MIMO, wireless channel to a second communication device in a closed loop MIMO communications system, the method comprising:
    receiving feedback at the first communication device from the second communication device, wherein the feedback includes a precoding matrix selection from the second communication device;
    generating a representation of a speed of the second communication device relative to the first communication device;
    responsive to the representation of the speed of the second communication device indicating a speed that is greater than a selection threshold, selecting a generalized precoding matrix that is different than a precoding matrix indicated by the precoding matrix selection from the second communication device, and
    responsive to selecting the generalized precoding matrix, transmitting a data block from the first communication device over the MIMO wireless channel to the second communication device using the generalized precoding matrix,
    wherein a transmission mode of the MIMO wireless channel is closed loop when the feedback is received at the first communication device, and wherein a transmission mode of the MIMO wireless channel remains closed loop when the generalized precoding matrix is selected.

2. The method of Claim 1 further comprising:
    responsive to the representation of the speed of the second communication device indicating a speed that is less than the selection threshold, selecting the precoding matrix indicated by the precoding matrix selection from the second communication device.

3. The method of claim 2 further comprising:
responsive to selecting the precoding matrix indicated by the precoding matrix selection from the second communication device, transmitting a data block from the first communication device over the MIMO wireless channel to the second communication device using the precoding matrix indicated by the precoding matrix selection from the second communication device.

4. The method of Claim 1, wherein generating the representation comprises generating the representation of the speed of the second communications device based on a Doppler shift of a transmission from the second communication device received at the first communication device.

5. The method of Claim 1, wherein generating the representation comprises generating the representation of the speed of the second communications device based on changes in channel quality information received from the second communication device.

6. The method of claim 1, wherein generating the representation comprises generating the representation of the speed of the second communications device based on changes in precoding matrix indices received from the second communication device.

7. The method of claim 1, wherein generating the representation comprises generating the representation of the speed of the second communications device based on information in pilot and/or reference signals received from the second communications device.

8. The method of Claim 1, wherein the precoding matrix selection comprises a precoding matrix index, PMI.

9. The method of Claim 1, wherein the first communication device comprises a radio base station.

10. The method of Claim 1 wherein selecting the generalized precoding matrix that is different than the precoding matrix indicated by the precoding matrix selection from the second communication device comprises blocking selection of the precoding matrix indicated by the precoding matrix selection from the second communication device.

11. A first communication device comprising:
a transceiver configured to provide transmissions over a multiple-input-multiple-output, MIMO, wireless channel to a second communication device and to receive transmissions from the second communications device in a closed loop MIMO communications system; and
a processor coupled to the transceiver wherein the processor is configured
to receive feedback through the transceiver from the second communication device, wherein the feedback includes a precoding matrix selection from the second communication device,
to generate a representation of a speed of the second communication device relative to the first communication device,
to select a generalized precoding matrix that is different than a precoding matrix indicated by the precoding matrix selection from the second communication device responsive to the representation of the speed of the second communication device indicating a speed that is greater than a selection threshold and,
to transmit a data block through the transceiver over the MIMO wireless channel to the second communication device using the generalized precoding matrix responsive to selecting the generalized precoding matrix,
wherein a transmission mode of the MIMO wireless channel is closed loop when the feedback is received at the first communication device, and wherein a transmission mode of the MIMO wireless channel remains closed loop when the generalized precoding matrix is selected.

12. The first communication device of Claim 11, wherein the processor is further configured to select the precoding matrix indicated by the precoding matrix selection from the second communication device responsive to the representation of the speed of the second communication device indicating a speed that is less than the selection threshold.

13. The first communication device of claim 12 wherein the processor is further configured to transmit a data block through the transceiver over the MIMO wireless channel to the second communication device using the precoding matrix indicated by the precoding matrix selection from the second communication device responsive to selecting the precoding matrix indicated by the precoding matrix selection from the second communication device.

14. The first communication device of Claim 11, wherein the processor is configured to generate the representation of the speed of the second communication device based on a Doppler shift of a transmission from the second communication device received through the transceiver.

15. The first communication device of Claim 11, wherein the processor is configured to generate the representation of the speed of the second communications device- based on changes in channel quality information received through the transceiver from the second communication device.

16. The first communication device of claim 11, wherein the processor is configured to generate the representation of the speed of the second communications device- based on changes in precoding matrix indices received through the transceiver from the second communication device.

17. The first communication device of Claim 11, wherein the processor is configured to generate the representation of the speed of the second communications device based on information in pilot and/or reference signals received through the transceiver from the second communications device.

18. The first communication device of claim 11, wherein the precoding matrix selection comprises a precoding, matrix index, PMI.

19. The first communication device of claim 11, wherein the first communication device comprises a radio base station.

20. The first communication device of Claim 11 wherein selecting the generalized precoding matrix that is different than the precoding matrix indicated by the precoding matrix selection from the second communication device comprises blocking selection of the precoding matrix indicated by the precoding matrix selection from the second communication device.

* * * * *